INVENTOR.
GERHARD H. DEWITZ

United States Patent Office 3,388,372
Patented June 11, 1968

3,388,372
DETERMINATION OF OCEAN SOUND
VELOCITY PROFILES
Gerhard H. De Witz, Glendale, Calif., assignor to General
Precision, Inc., a corporation of Delaware
Filed May 22, 1967, Ser. No. 640,222
9 Claims. (Cl. 340—3)

ABSTRACT OF THE DISCLOSURE

A method for the dynamic and continuous determination of sound velocities at various ocean depths by transmitting in a narrow beam sound pulses and, through reception with spaced receiving hydrophones, measure by triangulation the total sound transmit time of the transmitted pulse as it penetrates through, and is scattered by sound scatterers, such as small marine life, gasses, temperature and salinity discontinuities, and other types of acoustic obstacles which are present in all sea water and which appear to the receiver as the source of the sound pulses.

BACKGROUND OF THE INVENTION

It is well known that the water beneath the surface of the sea is a turbulent mass of subsurface currents of various directions, temperatures, and salinity. The natural solar heat exchange establishes predominantly horizontal layers of nearly equal temperature, salinity and pressure.

The velocity of sound through water varies with the temperature, pressure and salinity, therefore, the velocity of sound propagated through the sea will be continually changing. These sound velocity changes modify the intensity and direction of travel of sound waves and thereby affect seriously all sonar devices which rely upon the velocity of sound in water for computing, for example, the time period required for sound pulses to propagate through an initial and reflected path. For computing the propagation conditions, a "profile" particularly of the vertical distribution of sound velocity is required. At times, the distribution of sound velocities in other than the vertical direction is also required.

In order to obtain sound velocity profiles for prediction or correction of sonar measurements, it is the present practice to record water pressure and temperature profiles by the use of a bathythermograph (a graphical thermometer), which is lowered on a cable to the desired sea depth whenever a temperature profile measurement is to be made. The temperature profile is then converted to a sound velocity profile, assuming the salinity to be constant. There have also been some usages of expendable devices which are dropped from a ship and which transmit the measured data to the ship by electrical or acoustical telemetry.

The vertical and horizontal distribution of sound velocities is not constant in time or location. A bathythermograph, or a sound velocimeter, cannot be used to measure, economically, the continual modifications of the profile, for example, from a moving ship.

Thus, an acoustically valid sound velocity profile cannot be readily obtained by the use of the bathythermograph, velocimeter, or the expendable versions, since these devices are designed to make a one time, single measurement valid only for the time and point of use.

Another phenomena which affects sound propagation are various sound scatterers that are present in variable densities in every cubic yard of ocean water. These scatterers may take the form of marine life, free and adsorbed gasses, and all sorts of microdiscontinuities of the temperature distribution, water motion, salinity and pressures. These discontinuities will scatter a sound wave or sonar ping in all directions and are detectable as weak echoes and, if the density of the scatterers is sufficiently high, the volume containing these dense scatterers may appear as a solid target to some of the sonar apparatus.

These scatterers which impair the operation of sonar devices are used to an advantage in the measurement of sound velocity profiles according to the teachings of this invention.

SUMMARY OF THE INVENTION

Briefly described, the invention includes the general concept of transmitting a short pulse of sound in a desired, mostly vertical, direction through the ocean mass containing sound scatterers which appear to a sensitive hydrophone and receiver as a large number of small targets and therefore as apparent sources of sound. The receiving hydrophones are spaced a known distance from the point of transmission of the short pulse of sound, e.g., the transducer, which permits triangulation by determination of the elapsed transit time between transducer, the apparent source and the receivers. From multiple, statistical measurements at increasing depths an accurate sound velocity profile may then be computed. The apparent depth or the depression angle to each individual or group of apparent sound sources may be determined by at least two basic methods. In the preferred embodiment, the difference in phase delay or arrival times of the echoes received by two spaced receiving hydrophones will yield measurement of depression angle. In a second embodiment, a plurality of receiving hydrophones are suitably spaced to provide either a plurality of directive receiving lobes or patterns of narrow beam width directed at predetermined angles of depression toward the path of the transmitted pulse, or a single narrow receiving lobe may be controlled in its angular position to intercept the path of the transmitted pulse at predetermined or calibrated depths.

DESCRIPTION OF THE DRAWING

In the drawings, which illustrate embodiments of the invention.

DETAILED DESCRIPTION

Figure 1:
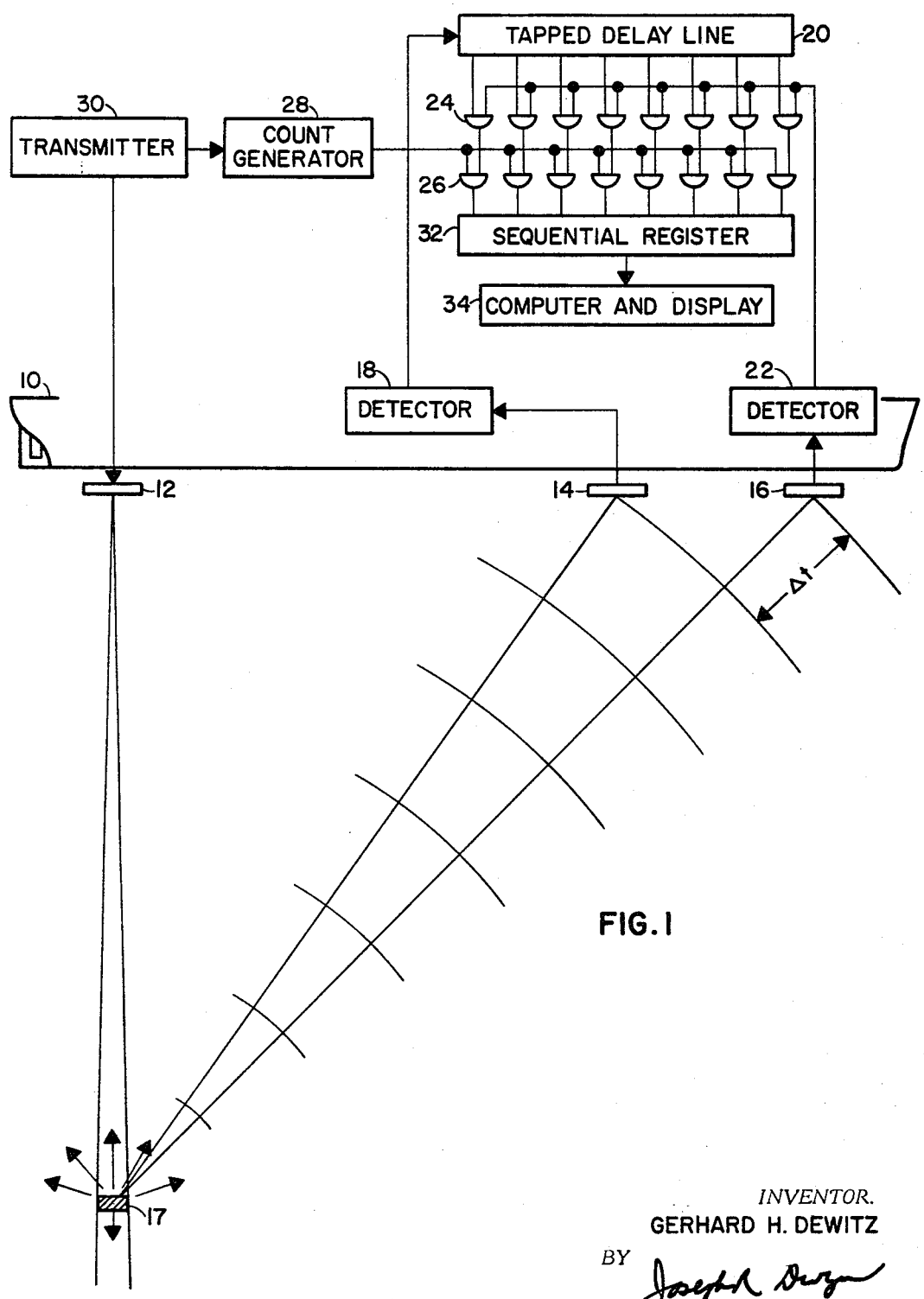
FIGURE 1 is an illustration of a preferred embodiment of the invention showing the echoes resulting from back-scattering of a transmitted pulse being received by two spaced receiving hydrophones and also showing in block diagram form, circuitry for determining the depression angle of the scattering source and the total transit time of the sound path for determining the various velocities of the transmitted sound pulse as it penetrates the ocean depths.

In the preferred embodiment illustrated in FIGURE 1, a vessel 10 is shown to be equipped with a transmitting transducer or projector 12 positioned near the stern and spaced therefrom near the bow, a pair of receiving hydrophones 14 and 16. Transmitting projector 12 must be capable of transmitting a narrow, well defined beam within which the energy of the sonar pulse travels and, as is well known in the art, should therefore be either equipped with a stiff diaphragm which acts as a piston, or may comprise an array of several projectors which are suitably spaced to achieve the desired diameter to wavelength ratio required to achieve narrow-beam characteristics.

Since the determination of sound velocity profiles is to be computed by a method involving the triangulation between the transmitting projector 12, the receiving hydrophones 14 and 16, and an apparent source of sound 17 caused by back or side-scattering of the sonar pulse as it penetrates through sound scatterers in the path of the transmitted pulse, it is apparent that greater accuracy will be achieved if the spacing between the transmitting projector 12 and the receiving hydrophones 14 and 16 is as large as possible on the bottom of vessel 10. Furthermore, since the preferred embodiment of the invention involves the time differences of the apparent sound pulses received by receiving hydrophone 14 and receiving hydrophone 16, it is desirable that there be maintained an optimum spacing between receiving hydrophones 14 and 16.

The spacing will depend upon the length of the vessel and the depth to which the velocity profiles are to be made, since, to facilitate computation, it is necessary that the apparent sound source be defined in depth which requires that the depression angles to the apparent sound source from both receiving hydrophones 14 and 16 remain less than 90°.

Since receiving hydrophones 14 and 16 are spaced by a known distance, the depth, or depression angle, from which an apparent source of sound is sensed by the receiving hydrophones, may be determined by the measurement of the time or phase difference of arrival and may be made by a delay line and/or signal correlation circuitry, as shown in FIGURE 1. Accordingly, receiving hydrophone 14, which will be the first to receive the sound pulse from its apparent source 17, is coupled to a detector 18, which may be an envelope detector or sine-zero crossing detector, and thence to a tapped delay line 20, the purpose of which is to introduce a delay between the signal received by hydrophone 14 to the point where it may be correlated with the signal received by receiving hydrophone 16. Tapped delay line 20 should be provided with many taps since the resolution and accuracy of the system will depend on the quantity of correlations that may be made as the transmitted pulse from projector 12 penetrates the ocean depths. The longest delay that is necessary in delay line 20 must be at least equal to the time difference, $\Delta t$, of the signals received by receiving hydrophones 14 and 16 from an apparent source located at a zero depression angle that is, a pulse received directly from the transmitting projector 12 and travelling horizontally at draft depth under he hull of vessel 10. If desired, taps may be positioned on delay line 20 to represent any desired time difference increments as a vertical transmitted pulse produces back scattering and thereby generates apparent sound sources at subsequent depth increments from the transmitting projector 12. Alternately, the incremental steps of time can be made equal, resulting in coarser measurements as depression angles increase. This is justified since the variables of sound velocity decrease as depth increases. It will be noted that, in either case, the time difference, $\Delta t$, is used to compute the depression angle of the apparent source 17, since the value of $\Delta t$ is proportional to the cosine of the depression angle.

Receiving hydrophone 16 is coupled to a detector 22, which is identical to detector 18. The output of detector 22 is applied to a plurality of AND gates 24, the other inputs of which are coupled to respective taps on delay line 20. AND gates 24 provide the necessary correlation between the signals received by hydrophone 16 and the delayed signals which were received by hydrophone 14. Thus, when a signal received by hydrophone 14 has been delayed to the point where its envelope or other characteristic is correlated with the envelope or other characteristic of the signal detected by hydrophone 16, the appropriate AND gate 24 will produce an output signal. The particular AND gate 24 which produces an output signal will thus represent a particular depression angle between transmitting projector 12, receiving hydrophone 16 and apparent sound source 17.

The output of each of AND gates 24 is connected as an input to each gate of a similar group of AND gates 26, and the second input to each of AND gates 26 is connected to a count generator 28, which produces counting pulses that may be in the order of one microsecond in length, and which are started or initiated by transmitter 30 which also supplies the pulse energy to the transmitting projector 12. Thus, when a particular AND gate 24 produces an output indicating a correlation of signals, the output is applied to a corresponding AND gate 26 which, at that instant, gates the output from count generator 28 into a sequential register 32. Thus, the particular AND gate 26 which is enabled, will provide an indicaion of depression angle to the apparent sound source 17, and the value of total time counted by count generator 28 will give an indication of total transit time of the sound pulse from its point of origin at transmitting projector 12 to a certain depth and then to its point of reception at receiving hydrophone 16. These values of depression angle and total transit time are then computed statistically and converted mathematically to a distribution of sound velocity values as a function of depth along the vertical centerline of sound transmission from projector 12, and thence these values are used directly for sonar predictions or are displayed in a display unit 34.

To those skilled in the arts, other circuitry will be apparent by which the information contained in the measurements can be extracted, such as the continual measurement of the relative and absolute phase delay of the received signals or the inclusion of the transmitting transducer acting as a hydrophone and receiver immediately after pulse emission, as an additional source of information.

Figure 2:
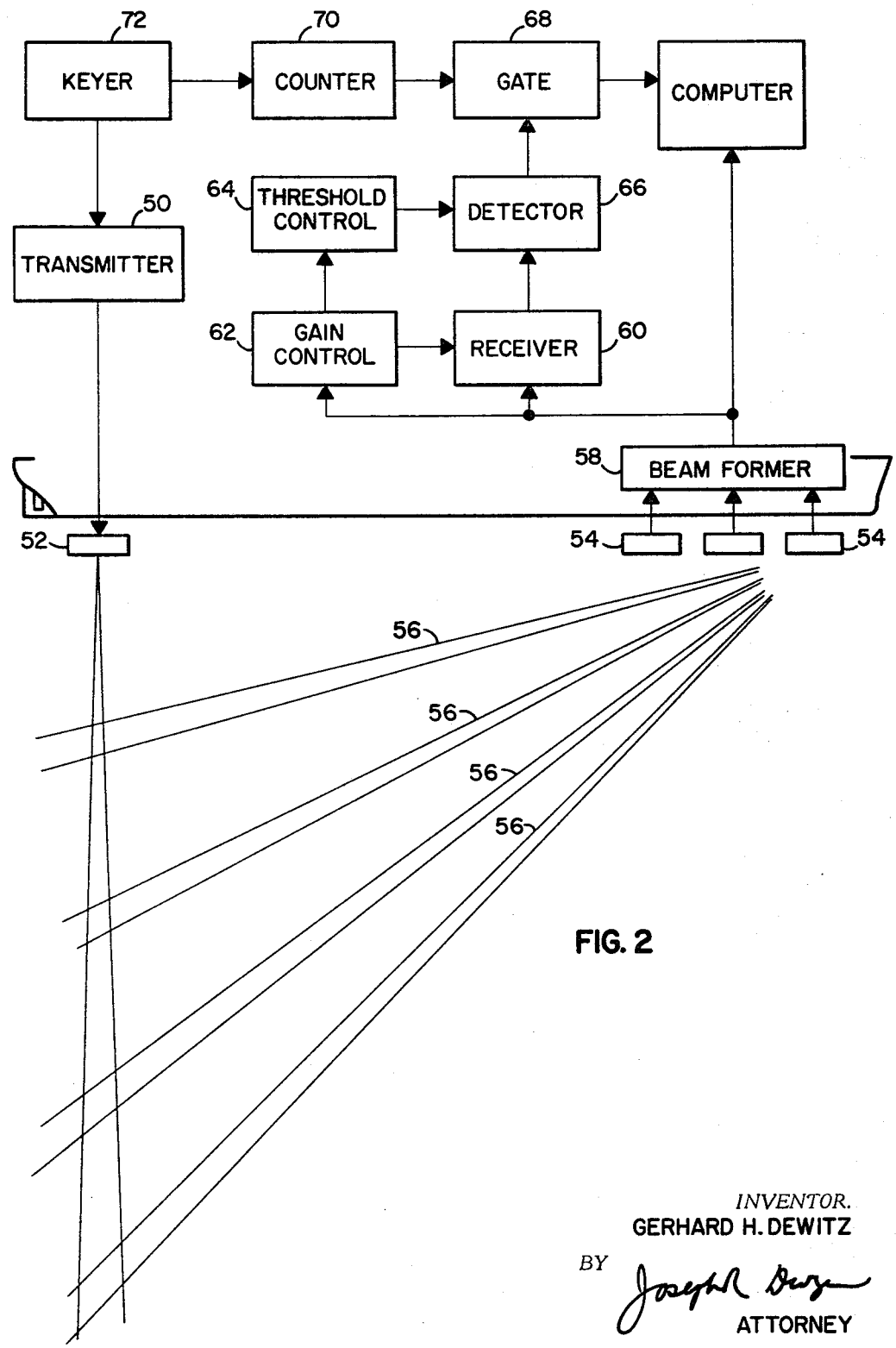
FIGURE 2 is an illustration of another embodiment showing the use of narrow beam, stationary receiving lobes for intercepting the path of the transmitted pulse at various depths.

FIGURE 2 illustrates another embodiment of the velocity profile measuring system which utilizes a plurality of stationary preformed directive receiving lobes to detect the back scattering produced by a transmitted pulse as it penetrates through the various signal scatterers in the ocean water. In this embodiment a sonar pulse transmitter 50 supplies energy to a transmitting projector 52 which transmits a short pulse in a narrow vertical beam into the sea water. An array of receiving hydrophones 54 is positioned at the greatest practical distance from hydrophone 52 and comprises a plurality of individual hydrophones which are suitably spaced and positioned so that its receiving pattern constitutes a plurality of narrow lobes 56 that are directed to intercept the path of the transmitted pulse emitting from transmitting projector 52. Each of the preformed lobes is adjusted to represent a fixed depression angle, and the total transit time of a transmitted pulse from transmitting projector 52 may be determined by subsequent time measuring through each of the preformed lobes 56.

Circuitry which may be utilized for the determination of total transit time of a transmitted pulse may consist of a beam former 58 which functions to preset the depression angles of the preformed lobes 56 and a receiver 60 which is coupled to beam former 58 and which serves to amplify the weak signals sensed by the receiving hydrophones 54 into usable electrical signals. Since the signals received by receiving hydrophones 54 are materially degraded as the depression angle is increased, it is desirable that the amplification receiver 60 be controlled by a variable gain control 62 which may be controlled by beam former 58 and which serves to increase the amplification or gain in receiver 60 as the depression angle increased by the appearance of signals in the various preformed receiving lobes 56. Gain control 62 is also coupled to a threshold control 64 in which a variable threshold voltage is developed according to the particular depression angle of receiving lobes 56. Threshold control 64 applies its variable voltage to a detector 66 which is also coupled to receiver 60 and which prefers signals produced by the back scattering and discriminates against average background noise by passing only those signals received from receiver 60 which exceed the threshold signal generated in threshold control 64. The output of detector 66 will appear as pulses or signal bursts which are applied to a gate 68, the other input of which is introduced from a counter 70. Counter 70 is a clocking device which may produce a binary count at a rate of one megacycle per second, and is initiated by a keyer 72 which not only starts counter 70, but also triggers pulse transmitter 50. The simultaneous inputs of counter 70 and detector 66 to gate 68 will produce an output of the total count of counter 70, which count represents total transit time of a pulse emanating from transmitting projector 52 through a known distance of ocean depth, by virtue of the known position of the receiving lobe 56 to the receiving hydrophones 54. The output from gate 68 may be applied to a computer 74, which also receives an indication of depression angle from beam former 58, to perform the necessary calculations for deriving values of various sound velocities through the ocean depth beneath the transmitting hydrophone 52.

If desired, the embodiment illustrated in FIGURE 2 may be altered by providing a single steerable narrow receiving lobe 56 in which the receiving hydrophones 54 are suitably phased so that the single receiving lobe may, upon the initiation of a pulse by keyer 72, start at a zero depression angle and sweep downward along the path of the transmitted pulse where it will track the scatter produced by the pulse as it penetrates, at varying velocities, the ocean mass.

It is apparent that the principles of measurement can be applied to the measurement of velocity profiles, also in the horizontal direction or any other direction, the only requirement being, that the orientation of the transmitting beam and that of the receiving hydrophones be set according to the direction in which the velocity profile is to be determined. It is further apparent that the substance of the invention is not restricted to use on a ship, but may be applied to fixed installations, such as to a support anchored on the bottom of the ocean with the transmission of pulses directed upwards; or it can be applied to floating buoys, whereby one buoy would act as a transducer with a narrow beam and two or more additional buoys, at some distance, would act as corresponding receivers. In this configuration the information could be transmitted by radio telemetry and the distances between the buoys determined by electromagnetic measurement, such as by radar or optical means.

What is claimed is:

1. A method for the dynamic and continuous determination of ocean sound velocities, comprising the steps of:
   - transmitting sound pulses confined to a narrow beam through the ocean mass;
   - detecting, at consecutive distances, said pulses as they produce apparent sound sources by scatter from sound scatterers in the ocean mass; and
   - measuring the total delay between the transmission of each pulse and the sequential detection of each scattering of the pulse.

2. The method of determination of sound velocity as claimed in claim 1, wherein the detecting step includes the step of:
   - determining the angle between the source of transmission, a receiving means positioned at a measurable distance from the source of transmission, and the apparent sound sources, said determination for providing a measurement of the distance between the source of transmission and the apparent sound sources and the distances between the apparent sound sources and the receiving means.

3. The method for determining sound velocities as claimed in claim 2, further including the step of:
   - computing the velocities of said pulses from the measurement of distances traveled during the measured delays of said pulses.

4. The method claimed in claim 3, wherein the determination of angle comprises the steps of:
   - detecting the apparent sound sources in at least two receiving hydrophones spaced at a measurable distance from each other;
   - delaying the signal received by one of said hydrophones for correlation with the signal received by the other of said hydrophones, the amount of delay to correlation being a function of the angle.

5. The method claimed in claim 3, wherein the determination of angle is determined by:
   - directing a plurality of narrow receiving lobes at known angles into the path of the transmitted pulses.

6. Apparatus for the dynamic and continuous determination of sound velocities at various ocean distances, said apparatus including:
   - transducer means positioned within the sea water for projecting narrow beam pulses through the ocean mass;
   - hydrophone means positioned in the sea water at a determinable distance from said transducer means for detecting said narrow beam pulses as they produce apparent sound sources by scatter from sound scatterers in the ocean mass;
   - distance determining means associated with said hydrophone means for determining the angle between the apparent sound source and a line extending through said transducer means and said hydrophone means; and
   - timing means coupled to said transducer means and said hydrophone means for measuring the elapsed time between the projection of pulses and the detection of the pulses.

7. The apparatus, as claimed in claim 6, wherein said transducer means and said hydrophone means are positioned at a predetermined spacing.

8. The apparatus, as claimed in claim 7, wherein said hydrophone means comprises a plurality of receiving hydrophones spaced to detect pulses from the apparent sound sources at different instants of time.

9. The apparatus, as claimed in claim 8, wherein said depth determining means comprises a delay line and correlation circuitry coupled to said plurality of receiving hydrophones for measuring the time differences of pulses received by each of said plurality of receiving hydrophones.

References Cited

UNITED STATES PATENTS

| | | | |
|---|---|---|---|
| 2,871,460 | 1/1959 | Beebe | 340—3 |
| 3,273,111 | 9/1966 | Parenti | 340—5 |

RICHARD A. FARLEY, *Primary Examiner.*